J. KENT & H. LEESON.
Knitting-Machine.
No. 160,685. Patented March 9, 1875.
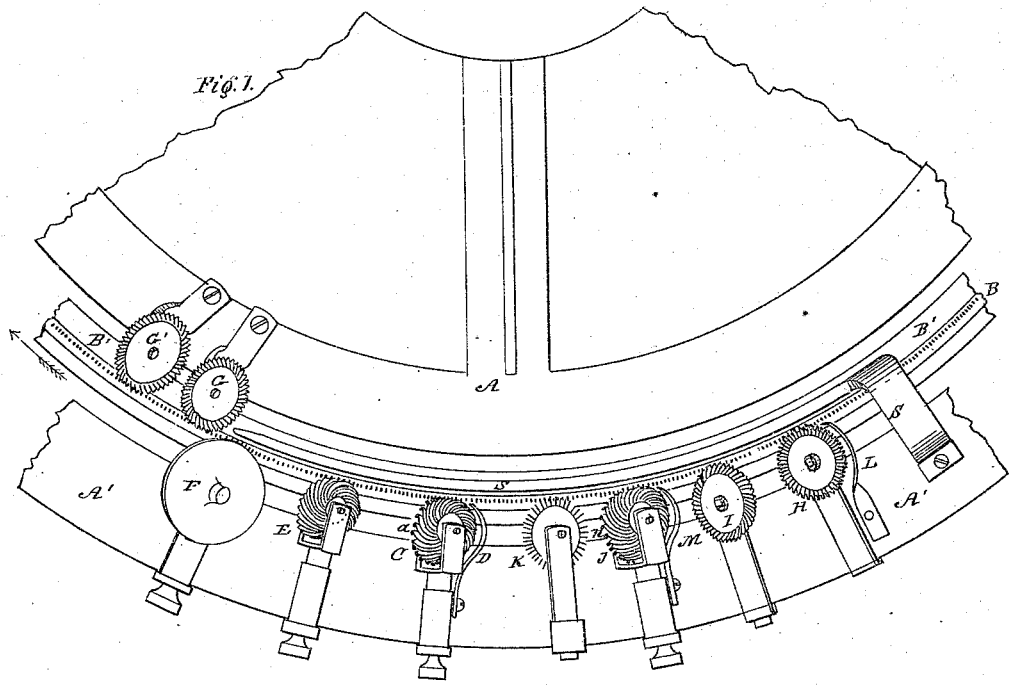
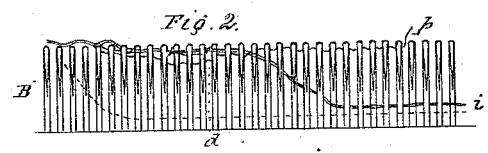
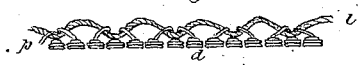
Witnesses:
A. P. Smith
Wm. S. Tindale
Inventors:
John Kent
Henry Leeson
By their Atty.
John S. Thornton 2 Sheets--Sheet 2.

J. KENT & H. LEESON.
Knitting-Machine.

No. 160,685.  Patented March 9, 1875.

Witnesses:
A. P. Smith
Wm. S. Tisdale

Inventors:
John Kent
Henry Leeson
By their atty
Jno. S. Thornton

THE GRAPHIC CO. PHOTO-LITH. 39 & 41 PARK PLACE, N.Y.

UNITED STATES PATENT OFFICE.

JOHN KENT, OF NEW YORK, AND HENRY LEESON, OF LOCUST VALLEY, N. Y.; SAID LEESON ASSIGNOR TO SAID KENT.

IMPROVEMENT IN KNITTING-MACHINES.

Specification forming part of Letters Patent No. 160,685, dated March 9, 1875; application filed November 3, 1874.

CASE B.

*To all whom it may concern:*

Be it known that we, JOHN KENT, of the city, county, and State of New York, and HENRY LEESON, of Locust Valley, Queens county, and State of New York, have jointly invented certain new and useful Improvements in Circular-Frame Knitting-Machines; and we hereby declare the following to be a full, clear, and exact description thereof, reference being had to the accompanying drawings, making a part of this specification.

This invention relates to certain improvements in what are known as circular-frame knitting-machines using a set of spring-bearded needles for making plain knitted fabrics; and the object of our invention is to produce upon such a machine a knitted fabric having a clear knitted face on one side of the fabric and a plush face on the other side, in such a manner that the plush-threads shall not appear on the face side of the fabric. It consists in certain peculiar devices, hereinafter particularly described, which we use upon and in connection with a circular knitting-frame of the kind above mentioned, and by means of which we are enabled to produce a fabric having the peculiarity above mentioned, the plush-threads being so arranged in relation to the knitting-threads that no part of the former passes through the fabric or shows upon the face of the same.

In order that our invention may be fully understood, we will proceed to particularly describe the same, referring to the accompanying drawings on two sheets, in which—

Figure 1 represents a plan view of a portion of a circular-frame knitting-machine with our improvements applied thereto; Fig. 2, a detail view to show the positions assumed by the several threads as the loops are being formed. Fig. 3 is a top view of a course of loops, showing the position of the plush-thread in the knitted web before it is carded. Figs. 4 to 16 are detail views, hereinafter referred to and described, to show the construction of the several feed-wheels and their operation.

Similar letters of reference indicate like parts in all the several figures.

Figure 4:
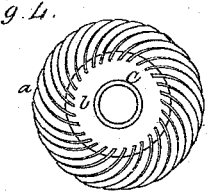
Figure 7:
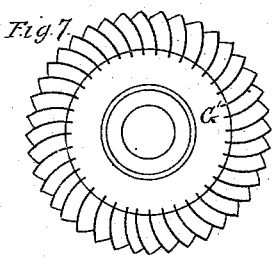
Figure 15:
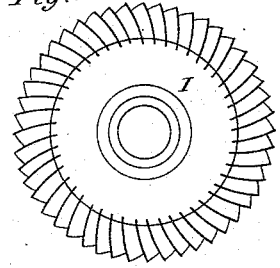
Figure 13:
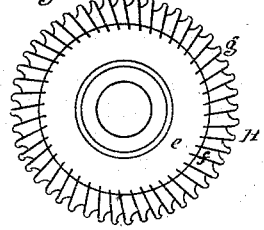
Figure 6:
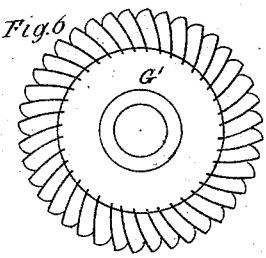
Figure 16:
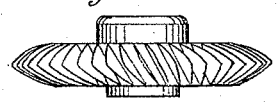
Figure 9:
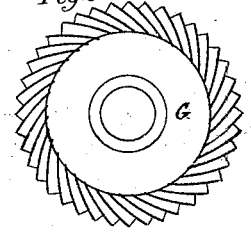
Figure 8:
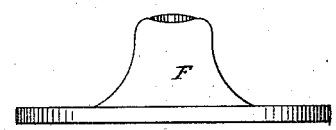

A represents a portion of the bed or frame of the machine, and A' the outer stationary frame, to which the feed-wheels are secured. B represents a set of needles, which are secured, in the ordinary manner, in the revolving frame B', which latter revolves in the direction indicated by the arrow, Fig. 1. The needles B are of the kind commonly known as the spring-bearded needle. C is the looping-wheel, which places the knitting-thread upon the needles and under the beards of the same. Fig. 4 represents a plan view, and Fig. 5 a side view, of this wheel, which is of the kind commonly used in circular knitting-machines with spring-needles, having nibs $c$ on its teeth $a$, which latter are slightly spiral, and are set in its hub $b$ obliquely to the axis of the said wheel. This wheel C has bearings in an arm secured to the frame A', in the usual manner. F is the presser, (shown at Fig. 8,) which is also of ordinary construction, and is attached to the frame A', in the usual manner, and is for the purpose of closing the beards of the needles to allow the loops forming the lower edge of the knitted web to rise over the same when released from the push-back S. G is the landing-wheel, which raises the lower edge of the knitted web while the presser F is pressing upon the beards of the needles, as above mentioned. Fig. 9 shows the lower face of this wheel, which has bearings in an arm secured to the bed A of the machine, and is set at an angle of about forty-five degrees to the plane of the latter. G' is the knocking-over wheel, of which Fig. 7 represents the upper face, and Fig. 6 the lower face. This wheel is secured to the bed A in a similar manner as the wheel G, and is for the purpose of throwing the loops which form the lower edge of the knitted web off the heads of the needles, thus looping them with the thread $d$, which is retained under the beards of the needles, and forms the loops of the new course, which now make the lower edge of the knitted web. These parts above described are used for making plain knitted fabrics, and we do not claim them separately as part of our present improvements, as they, with the frame and the parts for giving motion to the machine, constitute the circular-frame knitting-machine to which our present improvements are applied, and in connection with which we carry out our present invention.

The parts which we add to and use in connection with the above for the purpose of making plush fabric with a clean knitted face, and which are hereinafter particularly described, are a plush-thread looping-wheel, H, of novel and peculiar construction; a clearing-wheel, I, for pushing down the plush-thread while a binding-thread is being placed upon the needles; an additional looper, J, for introducing the binding-thread, and a plush-blending wheel, K, of novel and peculiar construction, which connects the plush-thread with the said binding-thread.

Figure 11:
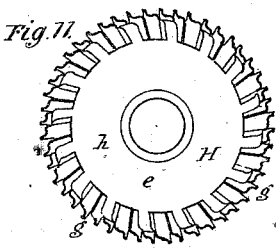
Figure 12:
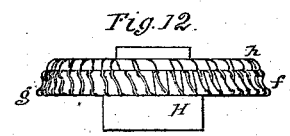
Figure 14:
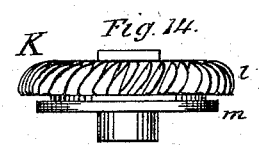

Fig. 11 shows the lower face of the plush-thread looper; Fig. 12, a side view, and Fig. 13 the upper face, of the same.

This wheel H consists of a hub, $e$, a series of teeth or blades, $f$, which are set at an angle of about forty-five degrees (or other suitable angle) with the axis of the wheel, and which are formed with a nib, $g$, on the upper part of their edges, and a circular plate, $h$, having slots cut in its periphery, which is rigidly secured on the lower side of the wheel, which said slots are each opposite to two adjoining spaces between the teeth of the wheel, the other spaces being covered by the projecting pieces of the said plate, which said projecting pieces push every third needle inward as the needle-frame revolves, and at the same time close the beard of the needle. The teeth $f$ are at such distance apart that they will work in between the needles, and the nibs $g$ seize the plush-thread as it is presented by the thread-guide L, and lay it in between the needles, the projections of the plate $h$ pushing inward every third needle, and at the same time closing the beards, so that the plush-thread is laid on the inside of two adjoining needles and on the outside of the next adjoining one, as shown at the right of Fig. 2, in which $i$ represents the plush-thread. This wheel H rotates upon a pin or journal secured by any suitable means to the frame A', at such angle from the perpendicular as will enable it to lay the thread over the needles, in the manner above indicated. The clearing-wheel I, (shown in Figs. 15 and 16, the former representing a plan view of its face, and the latter a side view,) which is somewhat similar in form to the wheels G and G', but works in the opposite direction, has bearings in an arm secured to the frame A', and is placed in such a position and at such angle that its teeth will work in between the needles in a downward direction. Its function is to force the plush-thread down the shanks of the needles, so as to be out of the way while the additional looper J is placing the binding-thread upon the needles.

Figure 10:
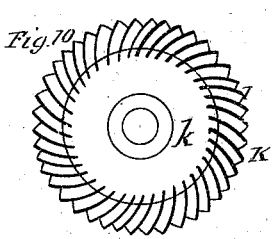
Figure 5:
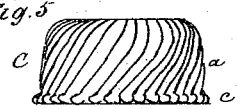

The additional looper J is similar in form and construction to the wheel C, already described, and is set in a similar way, its function being to place the second or binding thread upon the needles, which it accomplishes by means of its nibs $n$ pushing the said thread, as it is received from the thread-guide M, under the beard of each needle as they successively come opposite to its teeth. The plush-blending wheel K consists of a hub, $k$, in which are set the teeth $l$, and a circular plate or presser, $m$, which is firmly attached to the upper face of the wheel. In Fig. 10 is shown a plan view of its lower face, and in Fig. 14 a side elevation of this wheel. It has bearings in an arm secured to the frame A', and is set at a suitable angle to the plane of the frame, to enable its teeth to work in between the needles as they revolve. Its teeth $l$ are set at a suitable angle to its axis, and present a face of about a quarter-circle to the needles. The teeth bring up the plush-thread and connect it with the second or binding thread, while the plate or presser $m$ pushes back the beard of the needle to allow the plush-thread to pass over the same.

The joint operation of these wheels, in connection with the wheels C, E, F, G, and G', is as follows. The plush-looper H takes the plush-thread $i$ from the thread-guide L, and places it upon and between the needles, in such a position that it passes over two adjoining needles on the inside of the circle of needles and over one needle on the outside alternately, the slotted plate $h$ closing the beards of the needles meantime, so that it shall pass over them. The clearing-wheel I then pushes the thread $i$ downward, as seen at the right of Fig. 2, so that it shall not interfere with the action of the additional looper J, which latter places the second or binding thread $p$ under the beards of the needles. The blending-wheel K then brings up the plush-thread $i$, and connects it with the binding-thread $p$, as seen at the center of said Fig. 2, this latter thread being thereby passed over the plush-thread at intervals of every third needle, and at the same time the presser $m$ closes the beards of the needles, so that the plush-thread may clear the same as it rises on the needles. The looping-wheel C then places the main knitting-thread $d$ under the beards of the needles, thus placing the plush-thread between these two knitting-threads. The dividing-wheel E now equalizes the loops; the landing-wheel brings up the loops forming the lower edge of the knitted web, (represented by the dotted line in said Fig. 2,) which had meanwhile been held down by the push-back S, and the presser F pushes back the beards of the needles to allow said loops to pass over the same. The wheel G' now throws these loops and the plush-thread off the needles, while the threads $p$ and $d$ remain on the needles, and now form the lower edge of the web. The plush-thread is thus laid in long loops on the back of the web, and only passes half-way through the fabric, and does not appear on the face side of the same.

The position of the plush-thread in relation to the knitting and binding threads is shown in Fig. 3, the said thread lying between the main thread $d$, which forms the knitted face of the fabric, and the binding-thread $p$, by which it is connected to the former.

After the fabric has been removed from the machine the plush-threads are subjected to the action of an ordinary card, to break the loops and bring out the plush in the ordinary manner.

Having thus described our improvements, what we claim as our invention is—

The combination of the plush-looping wheel H, plush-blending wheel K, and wheels I and J, each constructed and arranged to operate as described, with an ordinary circular-frame knitting-machine, substantially as and for the purposes herein specified.

JOHN KENT.
HENRY LEESON.

Witnesses:
  JOHN O. GRADY,
  JOHN S. THORNTON.